US008675505B2

(12) United States Patent  (10) Patent No.: US 8,675,505 B2
Singhai et al.  (45) Date of Patent: Mar. 18, 2014

(54) METHODS AND APPARATUS FOR EFFICIENT NETWORK INFORMATION ACQUISITION OVER A DVB NETWORK

(75) Inventors: Sandeep Singhai, San Diego, CA (US); Bollapragada Venkata Janaki Manohar, San Diego, CA (US); Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 528 days.

(21) Appl. No.: 12/145,979

(22) Filed: Jun. 25, 2008

(65) Prior Publication Data

US 2009/0013367 A1   Jan. 8, 2009

Related U.S. Application Data

(60) Provisional application No. 60/946,352, filed on Jun. 26, 2007.

(51) Int. Cl.
    *H04J 1/16*   (2006.01)
(52) U.S. Cl.
    USPC ........................................................ 370/252
(58) Field of Classification Search
    USPC ........................................................ 370/252
    See application file for complete search history.

(56) References Cited

U.S. PATENT DOCUMENTS

| 2003/0039228 A1* | 2/2003 | Shiu et al. ...................... 370/331 |
| 2007/0268874 A1* | 11/2007 | Vare et al. ...................... 370/338 |
| 2008/0065828 A1* | 3/2008 | Iwamoto ........................ 711/114 |
| 2009/0225780 A1* | 9/2009 | Tatsumi ......................... 370/474 |

FOREIGN PATENT DOCUMENTS

WO   WO 2007/004453 A1 * 1/2007  ............. H04N 7/173

OTHER PUBLICATIONS

"Bear", How to Easily Change to Subchannels, Jul. 12, 2006, DVB Owners Discussion Forum, pp. 1-3. Web Address http://forums.dvbowners.com/lofiversion/index.php/t6457.html.*
International Preliminary Report on Patentabilitiy, PCT/US2008/068417, International Preliminaty Examining Authority, European Patent Office, Oct. 9, 2009.
"Digital Video Broadcasting (DVB): DVB specifications for data broadcasting, European Broadcasting Union/ Union Europeenne de Reido-Television, EBU-UER; ETSI EN 301 192", V1.4.1 (Nov. 2004).
International Search Report, PCT/US2008/068417, International Searching Authority, Mar. 30, 2009, European Patent Office.

(Continued)

*Primary Examiner* — Mark Rinehart
*Assistant Examiner* — Christopher R Crompton
(74) *Attorney, Agent, or Firm* — Fulbright & Jaworski LLP

(57) ABSTRACT

Methods and apparatus for efficient network information acquisition over a DVB network. In an aspect, a method includes identifying an IP/MAC platform, acquiring network information table (NIT) information in a transport stream being transmitted on a forward link frequency, acquiring IP/MAC network table (INT) information associated with the IP/MAC platform based on the NIT information, creating a network list that identifies all networks referred to by all stream location descriptors associated with the selected IP/MAC platform based on the INT information, and acquiring network information for all the networks in the network list. In an aspect, an apparatus includes means for identifying an IP/MAC platform, means for acquiring NIT information, and means for acquiring INT information, means for creating a network list that identifies networks associated with the selected IP/MAC platform, and means for acquiring network information for all the networks in the network list.

28 Claims, 5 Drawing Sheets

(56) References Cited

OTHER PUBLICATIONS

Written Opinion, PCT/US2008/068417, International Searching Authority, Mar. 30, 2009, European Patent Office.
"Digital Video Broadcasting (DVB); DVB-H Implementation Guidelines European Broadcasting Union Union Eureopeenne de Radio-Television EBUUER; ETSI TR 102 377", ETSI Standards, LIS, Sophia Antipolis Cedex, France, vol. BC, No. V1.2.1, Nov. 1, 2005.
DVB-H Implementation Guidelines, European Broadcasting Union, May 31, 2005, pp. 47-55 and 71-73.
Digital Video Broadcasting (DVB); DVB-DVB specifications for data broadcasting Europeenne de Radio-Telecommunications series, EBU-UER; ESTI EN 301 192 v1.4.1 (Jun. 2004).

* cited by examiner

METHODS AND APPARATUS FOR EFFICIENT NETWORK INFORMATION ACQUISITION OVER A DVB NETWORK

CLAIM OF PRIORITY UNDER 35 U.S.C. §119

The present Application for Patent claims priority to Provisional Application No. 60/946,352 entitled "METHODS AND APPARATUS TO OPTIMIZE NETWORK INFORMATION ACQUISITION" filed Jun. 26, 2007, and assigned to the assignee hereof and hereby expressly incorporated by reference herein.

BACKGROUND

1. Field

The present application relates generally to the operation of broadcast networks, and more particularly, to methods and apparatus for improved DVB network information acquisition.

2. Background

Transport streams in a Digital Video Broadcast (DVB) network employ a construct known as an IP/MAC Notification Table (INT) as part of Program Specific Information/Service Information signaling. Essentially, the INT provides a flexible address resolution mechanism to locate IP/MAC streams within a DVB network. The address resolution is achieved by providing a mapping of (a range of) IP/MAC addresses to a corresponding stream location where the stream location is given in the form of a network identifier (ID), original network ID, transport stream ID, service ID and component tag. The IP/MAC addresses are scoped by an IP/MAC platform. The IP/MAC platform represents a harmonized IP/MAC address space, i.e., one without any address conflicts. An IP/MAC platform may span several transport streams within one or multiple networks. Conversely, a transport stream or a network may contain more than one IP/MAC platforms.

A DVB receiver needs to acquire sufficient network information so that it can translate the above stream locations into physical layer parameters (frequency, modulation, etc.). The network information is carried in a Network Information Table (NIT)—Actual and a Network Information Table—Other. On a given transport stream, the NIT-Actual carries network information of the network to which the transport stream belongs while the NIT-Other carries information on other networks. Transmission of the NIT-Actual is mandatory while transmission of NIT-Other is optional.

A brute force approach to acquire complete network information can be quite inefficient and time consuming. For example, since a receiver has no knowledge of which networks can be potentially referred to by stream locations in the INT, a receiving device can utilize a brute force approach by tuning to all the possible frequencies to acquire the NIT so that it has network information for all the possible networks. Additionally, if the NIT-Other is transmitted, the receiver can potentially receive the complete network information by tuning to only a subset of frequencies. However, a receiver has no a-priory knowledge about whether NIT-Other is being transmitted on a particular transport stream and the periodicity of transmission of the NIT-Other may be much higher than that of the NIT-Actual. Hence, if a receiver wishes to acquire the NIT-Other, it has to stay on a transport stream much longer to receive the NIT-Other or until a time-out occurs. This in turn may lead to very long network information acquisition times and result in an unsatisfactory user experience.

Therefore, it is desirable to have an information acquisition mechanism that operates to allow a device to acquire DVB network information in a fast and efficient manner.

SUMMARY

In one or more aspects, an information acquisition system, comprising methods and apparatus, is provided that operates to allow a device to acquire information in a DVB network. For example, in an aspect, the information acquisition system obtains only as much network information in a brute force manner as necessary to acquire INT information for a selected platform. Once the INT is acquired, the system prepares a list of all network identifiers referred to by all the stream locations for the selected platform. The system then optimizes network information acquisition by acquiring information only for networks present in the above network list. As a result, the information acquisition system operates to acquire network information in a fast and efficient manner.

In an aspect, a method is provided for network information acquisition. The method comprises identifying a selected IP/MAC platform, acquiring network information table (NIT) information in a transport stream being transmitted on a forward link frequency, and acquiring IP/MAC network table (INT) information associated with the selected IP/MAC platform based on the NIT information. The method also comprises creating a network list that identifies all networks referred to by all stream location descriptors associated with the selected IP/MAC platform based on the INT information, and acquiring network information for all the networks in the network list.

In an aspect, an apparatus is provided for network information acquisition. The apparatus comprises acquisition logic configured to: identify a selected IP/MAC platform; acquire network information table (NIT) information in a transport stream being transmitted on a forward link frequency; and acquire IP/MAC network table (INT) information associated with the selected IP/MAC platform based on the NIT information. The acquisition logic is also configured to create a network list that identifies all networks referred to by all stream location descriptors associated with the selected IP/MAC platform based on the INT information, and acquire network information for all the networks in the network list.

In an aspect, an apparatus is provided for network information acquisition. The apparatus comprises means for identifying a selected IP/MAC platform, means for acquiring network information table (NIT) information in a transport stream being transmitted on a forward link frequency, and means for acquiring IP/MAC network table (INT) information associated with the selected IP/MAC platform based on the NIT information. The apparatus also comprises means for creating a network list that identifies all networks referred to by all stream location descriptors associated with the selected IP/MAC platform based on the INT information, and means for acquiring network information for all the networks in the network list.

In an aspect, a computer program product is provided for network information acquisition. The computer program product comprises a machine-readable medium that comprises a first set of codes for causing a computer to identify a selected IP/MAC platform, a second set of codes for causing the computer to acquire network information table (NIT) information in a transport stream being transmitted on a forward link frequency, and a third set of codes for causing the computer to acquire IP/MAC network table (INT) information associated with the selected IP/MAC platform based on the NIT information. The computer readable medium also comprises a fourth set of codes for causing the computer to create a network list that identifies all networks referred to by all stream location descriptors associated with the selected IP/MAC platform based on the INT information, and a fifth set of codes for causing the computer to acquire network information for all the networks in the network list.

In an aspect, at least one integrated circuit is provided that is configured for network information acquisition. The at least one integrated circuit comprises a first module configured to identify a selected IP/MAC platform, a second module configured to acquire network information table (NIT) information in a transport stream being transmitted on a forward link frequency, and a third module configured to acquire IP/MAC network table (INT) information associated with the selected IP/MAC platform based on the NIT information. The at least one integrated circuit also comprises a fourth module configured to create a network list that identifies all networks referred to by all stream location descriptors associated with the selected IP/MAC platform based on the INT information, and a fifth module configured to acquire network information for all the networks in the network list.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

In one or more aspects, an information acquisition system, comprising methods and apparatus, is provided that operates to allow a device to acquire information in a DVB network. In an aspect, the information acquisition system operates to prepare a list of all network identifiers referred to by all the stream locations for a selected platform. The system then optimizes network information acquisition by acquiring information only for networks present in the above network list. As a result, the information acquisition system operates to acquire network information in a fast and efficient manner to provide for an enhanced user experience.

The information acquisition system described herein is well suited for use in DVB based broadcast systems but may be used in other similar broadcast or multicast systems as well. It should be note that the contents and format of information contained in NIT and INT tables is well known and that more detailed information can be found in available Digital Video Broadcasting Specifications such as the Specification for Service Information (SI) for DVB Systems (ETSI EN 300 468 V1.8.1) and the DVB Specification for Data Broadcasting (ETSI EN 301 192 v1.4.2), which are incorporated by reference herein for all purposes.

Figure 1:
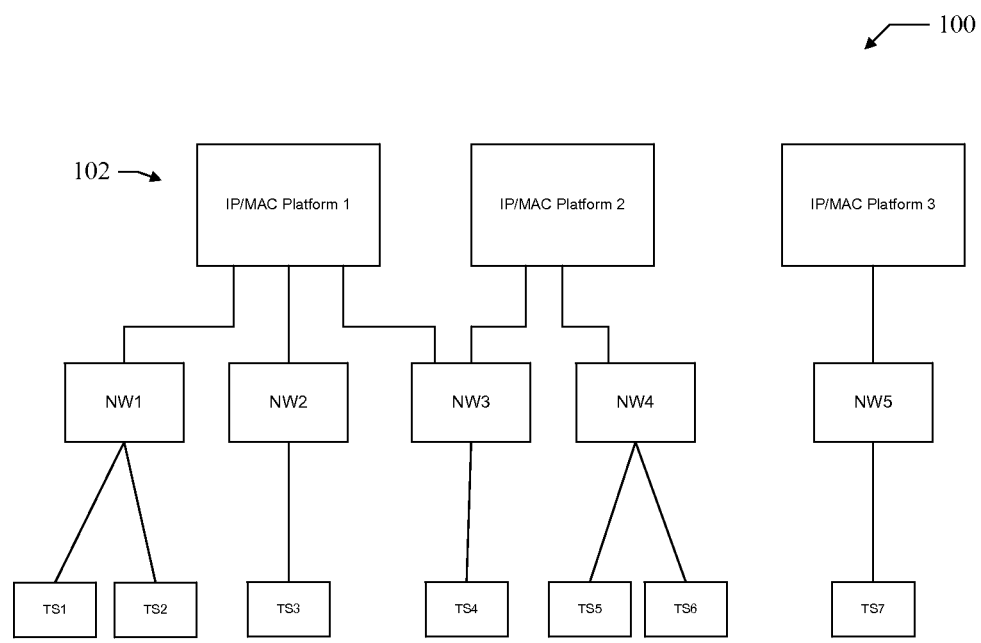
FIG. 1 shows a DVB-H distribution network.

FIG. 1 shows a DVB distribution network 100. As shown in the diagram, the DVB distribution network 100 comprises one or more IP/MAC platforms 102. Each IP/MAC platform represents a harmonized IP/MAC address space, i.e., one without any address conflicts. An IP/MAC platform may span several transport streams within one or multiple networks. Conversely, a transport stream or a network may contain more than one IP/MAC platforms.

Referring to FIG. 1, the NIT-Actual on TS1 and TS2 carry information about NW1, e.g., information about all the transport streams in the network, RF and physical layer parameters associated with acquiring these transport streams. The optional NIT-Other table carries information about other networks. These other networks may belong to one or more platforms.

In an aspect, the information acquisition system provides an information acquisition algorithm that operates to obtain network information in an efficient manner. In an aspect, the algorithm obtains only as much network information in the above described brute force manner as necessary to acquire the INT for a selected platform. Once the INT is acquired, the information acquisition system prepares a network list of all the network identifiers referred to by all the stream locations for the selected platform. Then the information acquisition system optimizes the network information acquisition by acquiring information only for networks present in the above network list. A more detailed description of the information acquisition algorithm is provided below.

Figure 2:
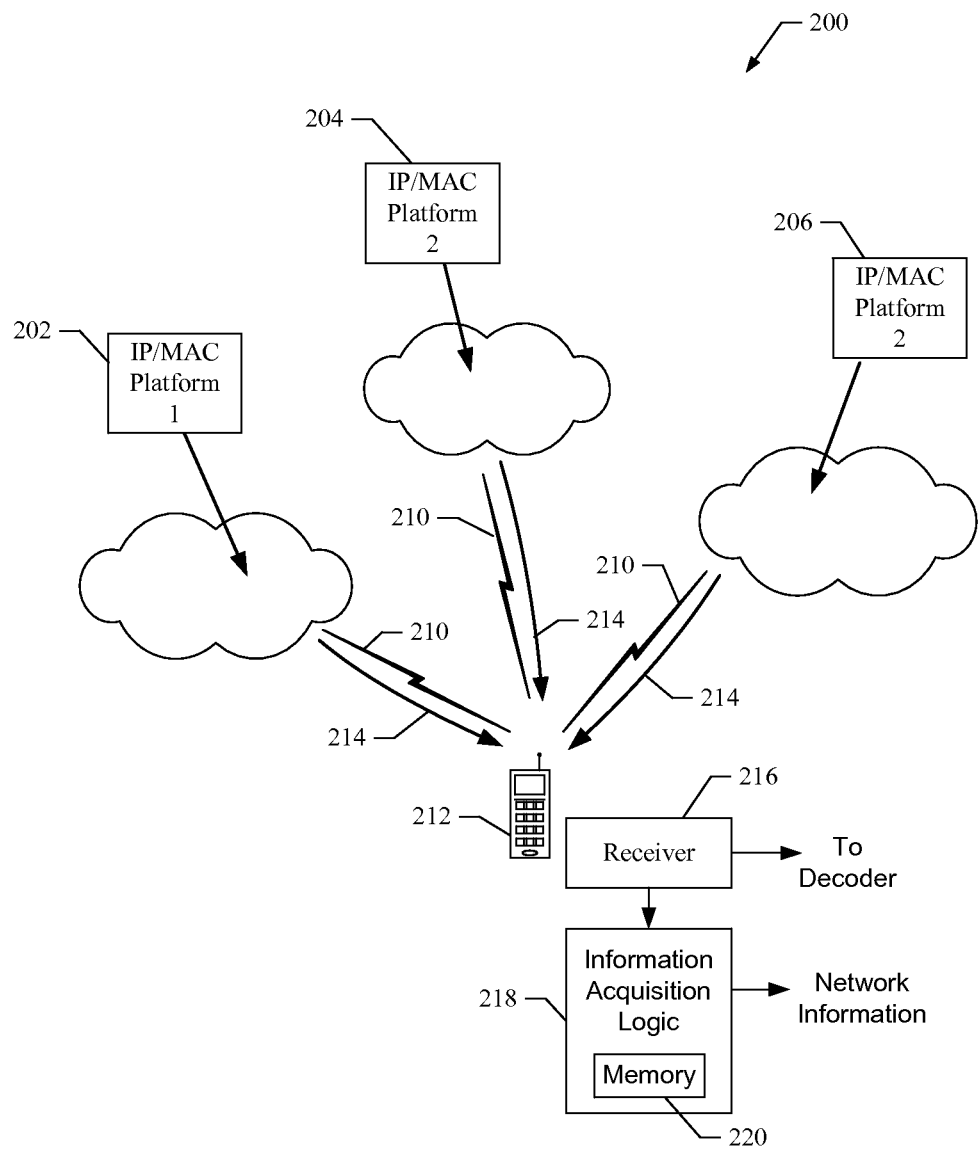
FIG. 2 shows a network that illustrates the operation of aspects of an information acquisition system.

FIG. 2 shows a DVB network 200 that illustrates the operation of aspects of an information acquisition system. For example, the DVB network 200 illustrates the distribution of three IP/MAC platforms 202, 204 and 206 to a portable device 212.

The device 212 receives transport streams 214 from the network 200 over wireless links 210. It should be noted that device 212 is representative and that aspects of the information acquisition system are suitable for use with any device capable of receiving DVB broadcasts.

The device 212 comprises a receiver 216 that can be tuned to multiple forward links to receive transport streams that carry the IP/MAC platforms 202, 204, 206. The receiver 216 demultiplexes selected program components carried on the received transport streams and provides these components for consumption by the device 212.

The device 212 comprises information acquisition logic 218. The information acquisition logic 218 operates to prepare a list of all network identifiers referred to by all the stream locations for a selected platform. The system then optimizes network information acquisition by acquiring information only for networks present in the above network list. As a result, the information acquisition system operates to acquire network information in a fast and efficient manner to provide for an enhanced user experience.

In an aspect, the information acquisition logic 218 obtains only as much network information in a brute force manner as necessary to acquire an INT for a selected platform. Once the INT is acquired, the information acquisition logic 218 prepares a list of all the network identifiers referred to by all the stream locations for the selected platform. Then the information acquisition logic 218 optimizes network information acquisition by acquiring information only for networks present in the above network list. In an aspect, the information acquisition logic 218 comprises memory 220 to store and maintain network information.

Thus, to provide for fast network information acquisition, the information acquisition logic 218 operates to perform one or more of the following functions.

1. Identify a selected IP/MAC platform.
2. Identify a forward link.
3. Obtain NIT information for the network corresponding to the transport stream being transmitted on the identified forward link frequency.
4. Obtain the INT for the selected platform.
5. Create a network list of all the network identifiers referred to by all stream location descriptors in the INT for the selected platform.
6. Determine that network information acquisition was successful if network information for all networks present in the above network list has been acquired.
7. Repeat operations 2-6 for all available forward link frequencies.

Therefore, in various aspects, the information acquisition system operates to obtain network information in a fast and efficient manner thereby providing for an enhanced user experience.

Figure 3:
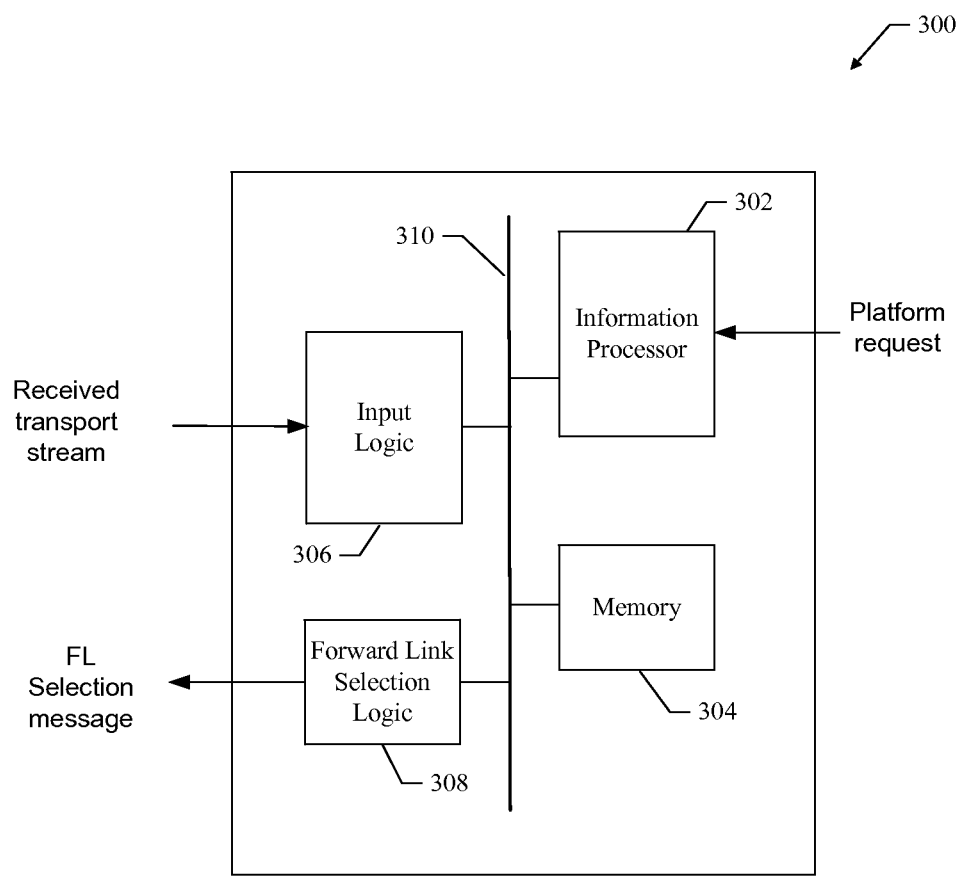
FIG. 3 shows information acquisition logic for use in aspects of an information acquisition system.

FIG. 3 shows information acquisition logic 300 for use in aspects of an information acquisition system. For example, the information acquisition logic 300 is suitable for use as the information acquisition logic 218 shown in FIG. 2. The information acquisition logic 300 comprises information processor 302, memory 304, input logic 306, forward link selection logic 308, and all coupled to a data bus 310.

The input logic 306 comprises at least one of a CPU, processor, gate array, hardware logic, memory elements, and/or hardware executing software. The input logic 306 operates to receive a transport stream from receiver logic that is tuned to a selected forward link in a DVB network. The input logic 306 passes the received transport stream to the information processor 302.

The memory 304 comprises at least one of a CPU, processor, gate array, hardware logic, memory elements, and/or hardware executing software. In an aspect, the memory 304 operates to store information that is obtained from a received transport stream. In an aspect, the information processor 302 operates to store NIT information, INT information and a network list in the memory 304.

The forward link selection logic 308 comprises at least one of a CPU, processor, gate array, hardware logic, memory elements, and/or hardware executing software. The forward link selection logic 308 operates to generate a forward link selection message that identifies a selected forward link to which a device receiver should be tuned. The forward link selection message is sent to the device receiver using any suitable technique. For example, the forward link selection message is sent to the receiver 216 shown in FIG. 2. With this information, the receiver 216 can tune to the selected forward link to receive a selected transport stream.

The information processor 302 comprises at least one of a CPU, processor, gate array, hardware logic, memory elements, and/or hardware executing software. In an aspect, the information processor 302 operates to receive a platform selection request that indicates a platform of a DVB network from which information is to be acquired. In another aspect, the information processor 302 determines the platform using any other suitable technique.

The information processor 302 also operates to determine forward link frequencies to which a device should be tuned in order to receive selected transport streams. In an aspect, the information processor 302 controls the forward link selection logic 308 to generate a forward link selection message that is sent to a device receiver to indicate a forward link to which the device receiver should be tuned to receive a selected transport stream.

In an aspect, the information processor 302 operates to create a network list of all the network identifiers referred to by all stream location descriptors in the INT associated with a selected platform. To do this, the information processor 302 performs an algorithm that is described in detail below. The algorithm operates to acquire network information in an efficient manner thereby enhancing device speed, efficiency, and user experience.

In an aspect, the information acquisition system comprises a computer program product having one or more program instructions ("instructions") or sets of "codes" stored or embodied on a machine-readable medium. When the codes are executed by at least one processor, for instance, the information processer 302, their execution causes the information processor 302 to provide the functions described herein. For example, the sets of codes may be embodied on a machine-readable medium, such as a floppy disk, CDROM, memory card, FLASH memory device, RAM, ROM, or any other type of memory device or machine-readable medium that interfaces to the information acquisition logic 300. In another aspect, the sets of codes may be downloaded into the information acquisition logic 300 from an external device or network resource. The sets of codes, when executed, cause a processor to provide aspects of an information acquisition system as described herein.

Figure 4:
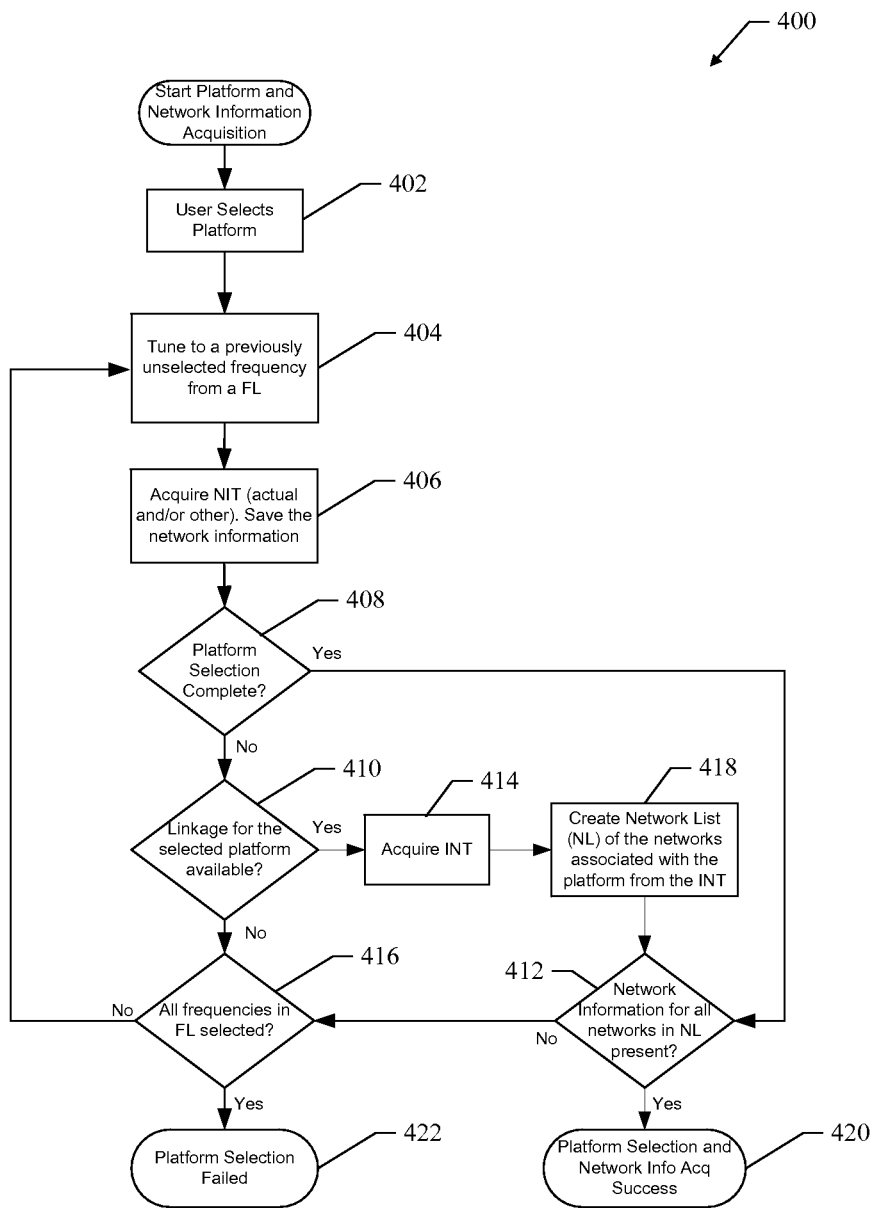
FIG. 4 shows a method for performing a platform and network information acquisition algorithm for use in aspects of an information acquisition system.

FIG. 4 shows a method 400 for performing a platform and network information acquisition algorithm for use in aspects of an information acquisition system. For clarity, the method 400 is described herein with reference to the information acquisition logic 300 shown in FIG. 3. For example, in an aspect, the acquisition processor 302 executes one or more sets of codes to control the information acquisition logic 300 to perform the functions described below.

At block 402, a platform is selected. In an aspect, the user provides a platform selection request to the information processor 302 to select a particular platform. In various aspects, the selection of the platform may be performed using any suitable technique, such as having pre-programmed selections at the information processor 302.

At block 404, a receiver is tuned to receive a previously unselected frequency from a forward link list. In an aspect, the information processor 402 is pre-programmed with a list of forward link frequencies or receives the list over the air. In an aspect, the information processor 302 operates to control the forward link selection logic 308 to send a FL selection message to a device receiver to tune to the previously unselected forward link frequency.

At block 406, NIT information (NIT-actual and optionally NIT-other) is acquired from the transport stream on the forward link frequency to which the device receiver is currently tuned. In an aspect, the input logic 306 obtains the NIT information from a received transport stream and stores it in the memory 304. A more detailed description of how NIT information is acquired is provided below with reference to FIG. 5.

At block 408, a determination is made as to whether the platform selection is complete, i.e., the INT for selected platform has been acquired. In an aspect, the information processor 302 makes this determination. If the platform selection is not complete, the method proceeds to block 410. If the platform selection is complete, the method proceeds to block 412.

At block 410, a determination is made as to whether linkage for the selected platform is available. In an aspect, the information processor 302 makes this determination. If linkage is available, the method proceeds to block 414. If linkage is not available, the method proceeds to block 416.

At block 414, INT information is acquired based on the NIT information. In an aspect, the information processor 302 acquires this information and stores it in the memory 304.

At block 418, a network list (NL) is created from the INT. The network list comprises all the networks referred to by all the stream location descriptors of the INT for the selected platform. In an aspect, the information processor 302 creates this list.

At block 412, a determination is made as to whether network information for all networks in the network list is present. In an aspect, the information processor 302 makes this determination. If information for all networks is not present, the method proceeds to block 416. If information for all networks is present, the method proceeds to block 420.

At block 416, a determination is made as to whether all frequencies in the forward link list have been selected. If all frequencies have not been selected, the method proceeds to block 404. If all frequencies in the forward link list have been selected, the method proceeds to block 422.

At block 422, the platform selection is determined to have failed.

At block 420, the platform selection and network information acquisition is determined to have been successful.

Thus, the method 400 operates to perform a platform and network information acquisition for use in aspects of an information acquisition system. It should be noted that the method 400 represents just one implementation and that other implementations are possible within the scope of the aspects.

Figure 5:
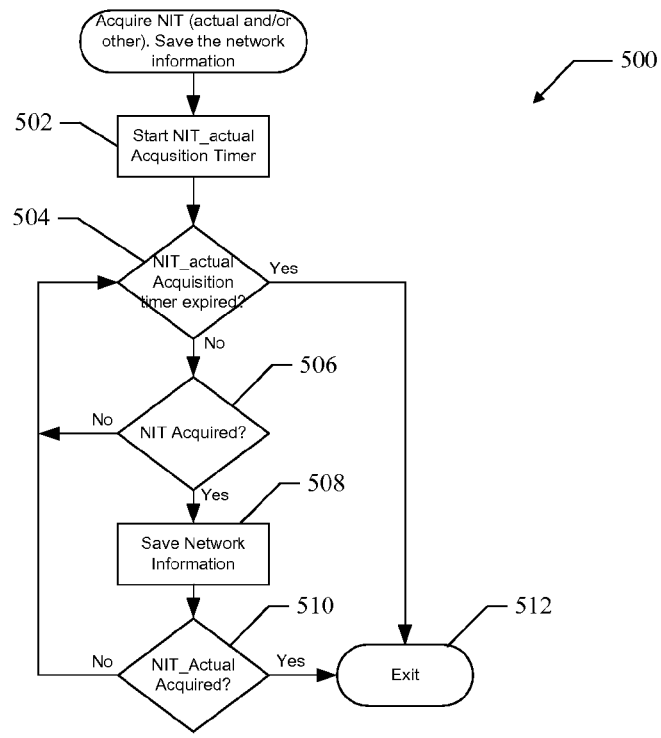
FIG. 5 shows a method for NIT acquisition for use in aspects of an information acquisition system.

FIG. 5 shows a method 500 for NIT acquisition for use in aspects of an information acquisition system. For example, the method 500 is suitable for use at block 406 of the method 400. In various aspects, the information processor 302 executes one or more sets of codes to control the information acquisition logic 300 to perform the functions described below. In an aspect, the method 500 operates to acquire at least NIT-actual and optionally NIT-other information.

At block 502, an acquisition timer is started. In an aspect, the information processor 302 comprises timing logic that is started to time the acquisition of NIT_actual information.

At block 504, a determination is made as to whether the timer has expired. In an aspect, the information processor 302 makes this determination. If the timer has not expired, the method proceeds to block 506. If the timer has expired, the method exits at block 512.

At block 506, a determination is made as to whether the NIT information has been acquired. For example, the information processor 302 operates to control the input logic 306 to acquire at least NIT-actual information and optionally NIT-other information. If the NIT information has been acquired, the method proceeds to block 508. If the NIT information has not been acquired, the method proceeds to block 504.

At block 508, the network information is saved.

At block 510, a determination is made as to whether NIT_actual has been acquired. If NIT_actual has been acquired, the method exits at 512. If NIT_actual has not been acquired, the method proceeds to block 504.

Thus, the method 500 operates to acquire NIT information for use in aspects of an information acquisition system. It should be noted that the method 500 represents just one implementation and that other implementations are possible within the scope of the aspects.

Figure 6:
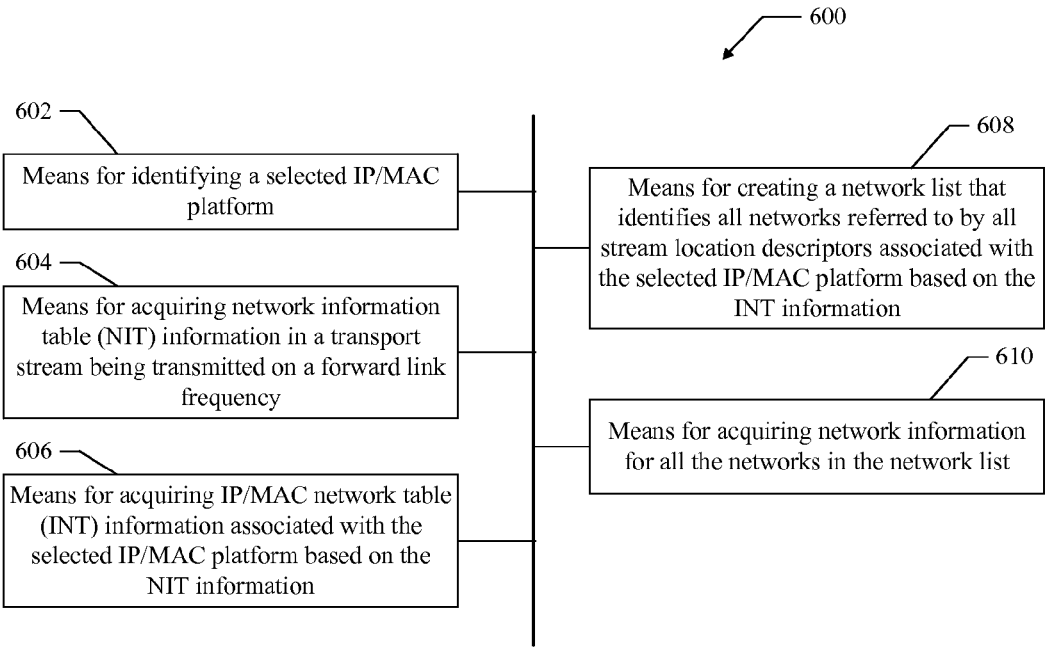
FIG. 6 shows information acquisition logic for use in aspects of a service acquisition system.

FIG. 6 shows information acquisition logic 600 for use in aspects of an information acquisition system. For example, the information processor 600 is suitable for use as the information acquisition logic 218 shown in FIG. 2. In an aspect, the information acquisition logic 600 is implemented by at least one integrated circuit comprising one or more modules configured to provide aspects of an information acquisition system as described herein. For example, in an aspect, each module comprises hardware and/or hardware executing software.

The information acquisition logic 600 comprises a first module comprising means (602) for identifying a selected IP/MAC platform, which in an aspect comprises the information processor 302. The information acquisition logic 600 also comprises a second module comprising means (604) for acquiring network information table (NIT) information in a transport stream being transmitted on a forward link frequency, which in an aspect comprises the information processor 302. The information acquisition logic 600 also comprises a third module comprising means (606) for acquiring IP/MAC network table (INT) information associated with the selected IP/MAC platform based on the NIT information, which in an aspect comprises the information processor 302. The information acquisition logic 600 also comprises a fourth module comprising means (608) for creating a network list that identifies all networks referred to by all stream location descriptors associated with the selected IP/MAC platform based on the INT information, which in an aspect comprises the information processor 302. The information acquisition logic 600 also comprises a fifth module comprising means (610) for acquiring network information for all the networks in the network list, which in an aspect comprises the information processor 302.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of an information acquisition system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A machine-implemented method for network information acquisition in a digital video broadcasting (DVB) network to enable access to a particular network, the method comprising:
   identifying a selected Internet Protocol/Media Access Control (IP/MAC) platform;
   receiving a list of broadcast frequencies for tuning to a particular broadcast frequency;
   selecting a broadcast frequency from among the list of broadcast frequencies for receiving a transport stream being transmitted on the selected broadcast frequency;
   acquiring network information table (NIT) information in the transport stream being transmitted on the selected broadcast frequency before an expiration of a predetermined period of time following a receipt of the transport stream;
   acquiring IP/MAC network table (INT) information associated with the selected IP/MAC platform based on the NIT information;
   creating a network list that identifies all networks referred to by all stream location descriptors associated with the selected IP/MAC platform based on the INT information, wherein the network list is distinct from the INT and NIT information; and
   acquiring network information for all the networks in the network list.

2. The method of claim 1, wherein said acquiring the NIT information comprises acquiring at least NIT actual information and optionally NIT other information.

3. The method of claim 1, wherein said acquiring the NIT information comprises acquiring the NIT information transmitted on a plurality of transport streams being transmitted on a plurality of broadcast frequencies.

4. The method of claim 1, wherein said acquiring the NIT information comprises acquiring the NIT information on the broadcast frequency for a selected time interval.

5. The method of claim 1, further comprising determining that the network information acquisition is successful if the network information associated with all the networks in the network list is acquired.

6. The method of claim 1, wherein acquiring network information table (NIT) information in the transport stream being transmitted on the broadcast frequency before the expiration of the predetermined period of time following the receipt of the transport stream comprises:
   starting an acquisition timer; and
   determining whether the acquisition timer has expired.

7. The method of claim 1, wherein selecting the broadcast frequency from among the list of broadcast frequencies comprises:
   determining whether the broadcast frequency was previously unselected; and
   selecting the broadcast frequency in response to determining the broadcast frequency was previously unselected.

8. The method of claim 1, further comprising:
   determining whether all broadcast frequencies from among the list of broadcast frequencies have been selected; and
   selecting, in response to determining that all broadcast frequencies have not been selected, a second broadcast frequency from among the list of broadcast frequencies for receiving a second transport stream being transmitted on the selected second broadcast frequency, wherein the second broadcast frequency was previously unselected.

9. An apparatus for network information acquisition in a digital video broadcasting (DVB) network to enable access to a particular network, the apparatus comprising:
   acquisition logic configured to:
      identify a selected Internet Protocol/Media Access Control (IP/MAC) platform;
      receive a list of broadcast frequencies for tuning to a particular broadcast frequency;
      select a broadcast frequency from among the list of broadcast frequencies for receiving a transport stream being transmitted on the selected broadcast frequency;
      acquire network information table (NIT) information in the transport stream being transmitted on the selected broadcast frequency before an expiration of a predetermined period of time following a receipt of the transport stream;
      acquire IP/MAC network table (INT) information associated with the selected IP/MAC platform based on the NIT information;
      create a network list that identifies all networks referred to by all stream location descriptors associated with the selected IP/MAC platform based on the INT information, wherein the network list is distinct from the INT and NIT information; and
      acquire network information for all the networks in the network list.

10. The apparatus of claim 9, wherein said acquisition logic is configured to acquire at least NIT actual information and optionally NIT other information.

11. The apparatus of claim 9, wherein said acquisition logic is configured to acquire the NIT information transmitted on a plurality of transport streams being transmitted on a plurality of broadcast frequencies.

12. The apparatus of claim 9, wherein said acquisition logic is configured to acquire the NIT information on the broadcast frequency for a selected time interval.

13. The apparatus of claim 9, wherein said acquisition logic is configured to determine that the network information acquisition is successful if the network information associated with all the networks in the network list is acquired.

14. An apparatus for network information acquisition in a digital video broadcasting (DVB) network to enable access to a particular network, the apparatus comprising:
   means for identifying a selected Internet Protocol/Media Access Control (IP/MAC) platform;
   means for receiving a list of broadcast frequencies for tuning to a particular broadcast frequency;
   means for selecting a broadcast frequency from among the list of broadcast frequencies for receiving a transport stream being transmitted on the selected broadcast frequency;

means for acquiring network information table (NIT) information in the transport stream being transmitted on the selected broadcast frequency before an expiration of a predetermined period of time following a receipt of the transport stream;

means for acquiring IP/MAC network table (INT) information associated with the selected IP/MAC platform based on the NIT information;

means for creating a network list that identifies all networks referred to by all stream location descriptors associated with the selected IP/MAC platform based on the INT information, wherein the network list is distinct separate from the INT and NIT information; and means for acquiring network information for all the networks in the network list.

15. The apparatus of claim 14, wherein said means for acquiring the NIT information comprises means for acquiring at least NIT actual information and optionally NIT other information.

16. The apparatus of claim 14, wherein said means for acquiring the NIT information comprises means for acquiring the NIT information transmitted on a plurality of transport streams being transmitted on a plurality of broadcast frequencies.

17. The apparatus of claim 14, wherein said means for acquiring the NIT information comprises means for acquiring the NIT information on the broadcast frequency for a selected time interval.

18. The apparatus of claim 14, further comprising means for determining that the network information acquisition is successful if the network information associated with all the networks in the network list is acquired.

19. A non-transitory machine-readable medium comprising a set of codes therein, which when executed by a computer cause the computer to perform a set of operations, the set of codes comprising:

a first set of codes for causing the computer to identify a selected Internet Protocol/Media Access Control (IP/MAC) platform;

a second set of codes for causing the computer to receive a list of broadcast frequencies for tuning to a particular broadcast frequency;

a third set of codes for causing the computer to select a broadcast frequency from among the list of broadcast frequencies for receiving a transport stream being transmitted on the selected broadcast frequency;

a fourth set of codes for causing the computer to acquire network information table (NIT) information in the transport stream being transmitted on the selected broadcast frequency before an expiration of a predetermined period of time following a receipt of the transport stream;

a fifth set of codes for causing the computer to acquire IP/MAC network table (INT) information associated with the selected IP/MAC platform based on the NIT information;

a sixth set of codes for causing the computer to create a network list that identifies all networks referred to by all stream location descriptors associated with the selected IP/MAC platform based on the INT information, wherein the network list is distinct separate from the INT and NIT information; and a seventh set of codes for causing the computer to acquire network information for all the networks in the network list.

20. The machine-readable medium of claim 19, wherein said fourth set of codes is configured to acquire at least one of NIT actual information and NIT other information.

21. The machine-readable medium of claim 19, wherein said fourth set of codes is configured to acquire the NIT information transmitted on a plurality of transport streams being transmitted on a plurality of broadcast frequencies.

22. The machine-readable medium of claim 19, wherein said fourth set of codes is configured to acquire the NIT information on the broadcast frequency for a selected time interval.

23. The machine-readable medium of claim 19, further comprising an eighth set of codes for causing the computer to determine that the network information acquisition is successful if the network information associated with all the networks in the network list is acquired.

24. At least one integrated circuit configured for network information acquisition in a digital video broadcasting (DVB) network to enable access to a particular network, the at least one integrated circuit comprising:

a first module configured to identify a selected Internet Protocol/Media Access Control (IP/MAC) platform;

a second module configured to receive a list of broadcast frequencies for tuning to a particular broadcast frequency;

a third module configured to select a broadcast frequency from among the list of broadcast frequencies for receiving a transport stream being transmitted on the selected broadcast frequency;

a fourth module configured to acquire network information table (NIT) information in the transport stream being transmitted on the selected broadcast frequency before an expiration of a predetermined period of time following a receipt of the transport stream;

a fifth module configured to acquire IP/MAC network table (INT) information associated with the selected IP/MAC platform based on the NIT information;

a sixth module configured to create a network list that identifies all networks referred to by all stream location descriptors associated with the selected IP/MAC platform based on the INT information, wherein the network list is distinct from the INT and NIT information; and a seventh module configured to acquire network information for all the networks in the network list.

25. The at least one integrated circuit of claim 24, wherein said fourth module is configured to acquire at least NIT actual information and optionally NIT other information.

26. The at least one integrated circuit of claim 24, wherein said fourth module is configured to acquire the NIT information transmitted on a plurality of transport streams being transmitted on a plurality of broadcast frequencies.

27. The at least one integrated circuit of claim 24, wherein said fourth module is configured to acquire the NIT information on the broadcast frequency for a selected time interval.

28. The at least one integrated circuit of claim 24, further comprising an eighth module configured to determine that the network information acquisition is successful if the network information associated with all the networks in the network list is acquired.

* * * * *